United States Patent [19]
Hynecek

[11] Patent Number: 6,040,569
[45] Date of Patent: Mar. 21, 2000

[54] FIXED-PATTERN-NOISE REDUCTION IN ACTIVE PIXEL IMAGE SENSORS

[75] Inventor: Jaroslav Hynecek, Richardson, Tex.

[73] Assignee: Texas Instruments Incorporated, Dallas, Tex.

[21] Appl. No.: 09/079,210

[22] Filed: May 14, 1998

Related U.S. Application Data

[60] Provisional application No. 60/046,492, May 14, 1997.

[51] Int. Cl.[7] .................................................... H01J 40/14
[52] U.S. Cl. ..................... 250/208.1; 257/212; 348/294
[58] Field of Search ........................ 250/208.1; 257/212, 257/290–292; 348/272, 273, 294, 281, 282

[56] References Cited

U.S. PATENT DOCUMENTS

| | | | |
|---|---|---|---|
| 4,901,129 | 2/1990 | Hynecek | 357/30 |
| 5,317,174 | 5/1994 | Hynecek | 257/212 |
| 5,781,312 | 7/1998 | Noda | 348/272 |
| 5,825,056 | 10/1998 | Yonemoto | 257/290 |

*Primary Examiner*—Stephone B. Allen
*Attorney, Agent, or Firm*—Alan K. Stewart; Wade James Brady, III; Richard L. Donaldson

[57] ABSTRACT

A device for sensing light includes: an active pixel sensor 20; a holding capacitor 67 for storing a pixel signal from the active pixel sensor 20; a scanning switch 71 coupled between the holding capacitor 67 and a sense line 80; a switch control line 76 for turning the switch 71 on and off; a logic gate 90 having a horizontal scan shift register input and a strobe input, the switch control line 76 is an output of the logic gate 90.

6 Claims, 2 Drawing Sheets

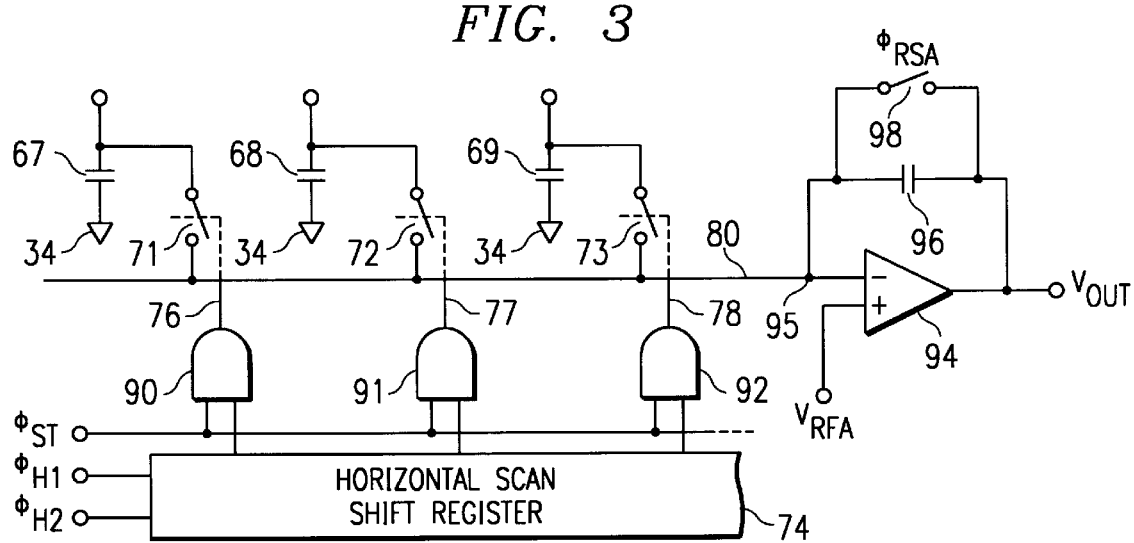
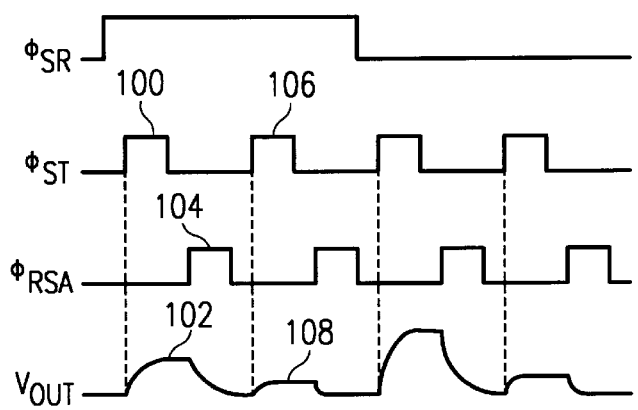
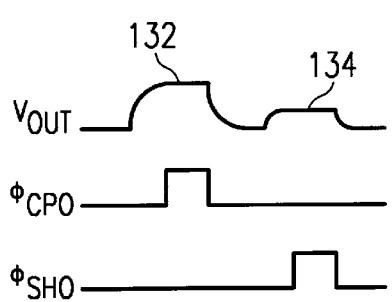
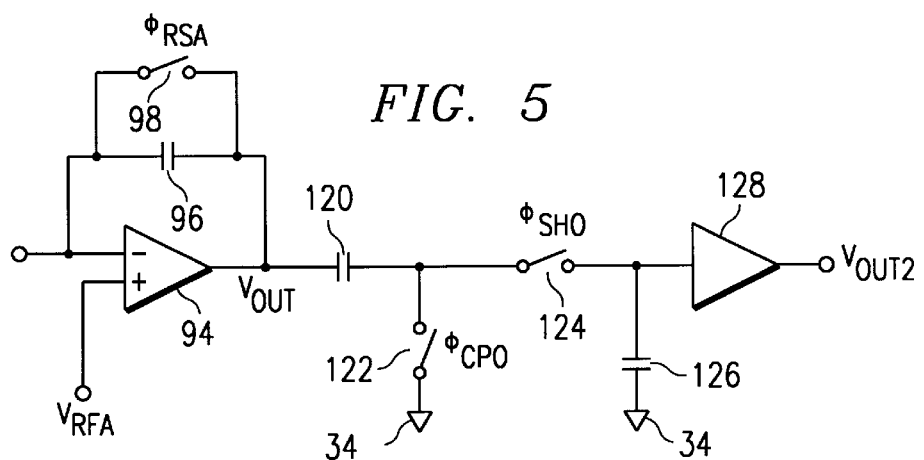

FIXED-PATTERN-NOISE REDUCTION IN ACTIVE PIXEL IMAGE SENSORS

This application claims priority under 35 USC § 119 (e)(1) of provisional application No. 60/046,492, filed May 14, 1997.

FIELD OF THE INVENTION

This invention generally relates to image sensing devices, and more particularly relates to fixed-pattern-noise reduction in active pixel image sensors.

BACKGROUND OF THE INVENTION

Bulk charge modulated devices (BCMD) (described in U.S. Pat. Nos. 4,901,129 and 5,317,174) and similar CMOS active pixel image sensors, used for converting images to video signals, suffer from vertical-fixed-pattern-noise (VFPN). In these devices, typically, the signal is generated in an array of photosites, converted into a voltage, and stored as charge on a bank of capacitors to form a horizontal line of video. The bank of capacitors is scanned by individual switches coupled to each capacitor. Because these switches cannot be made identical, each switch transfers a different amount of switching charge on the sense line in addition to the image signal. The switching feedthrough is the same for each horizontal line of video. This switching feedthrough noise manifests itself as a vertical-fixed-pattern-noise because all the photosites in a particular vertical line are read out through the same switch.

SUMMARY OF THE INVENTION

Generally, and in one form of the invention, a device for sensing light includes: an active pixel sensor; a holding capacitor for storing a pixel signal from the active pixel sensor; a scanning switch coupled between the holding capacitor and a sense line; a switch control line for turning the switch on and off; a logic gate having a horizontal scan shift register input and a strobe input, the switch control line is an output of the logic gate.

BRIEF DESCRIPTION OF THE DRAWINGS

In the drawings:

FIG. 3 is a preferred embodiment scanning circuit for fixed-pattern-noise reduction;

is FIG. 4 is a timing diagram for the circuit of FIG. 3;

FIG. 5 is a clamping and sampling circuit;

FIG. 6 is a timing diagram for the circuit of FIG. 5.

Corresponding numerals and symbols in the different figures refer to corresponding parts unless otherwise indicated.

DETAILED DESCRIPTION OF PREFERRED EMBODIMENTS

Figure 1:
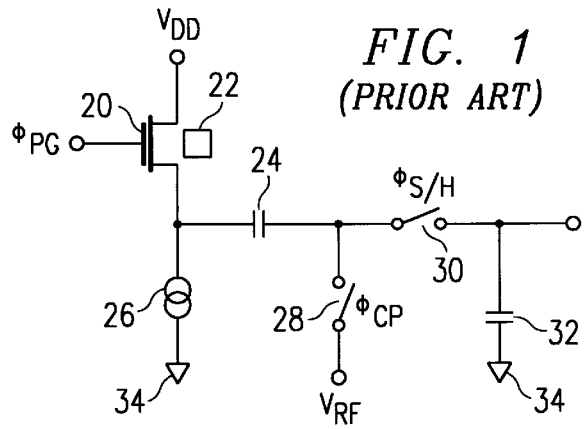
FIG. 1 is a typical prior art active pixel sensor with associated output circuitry.
Figure 2:
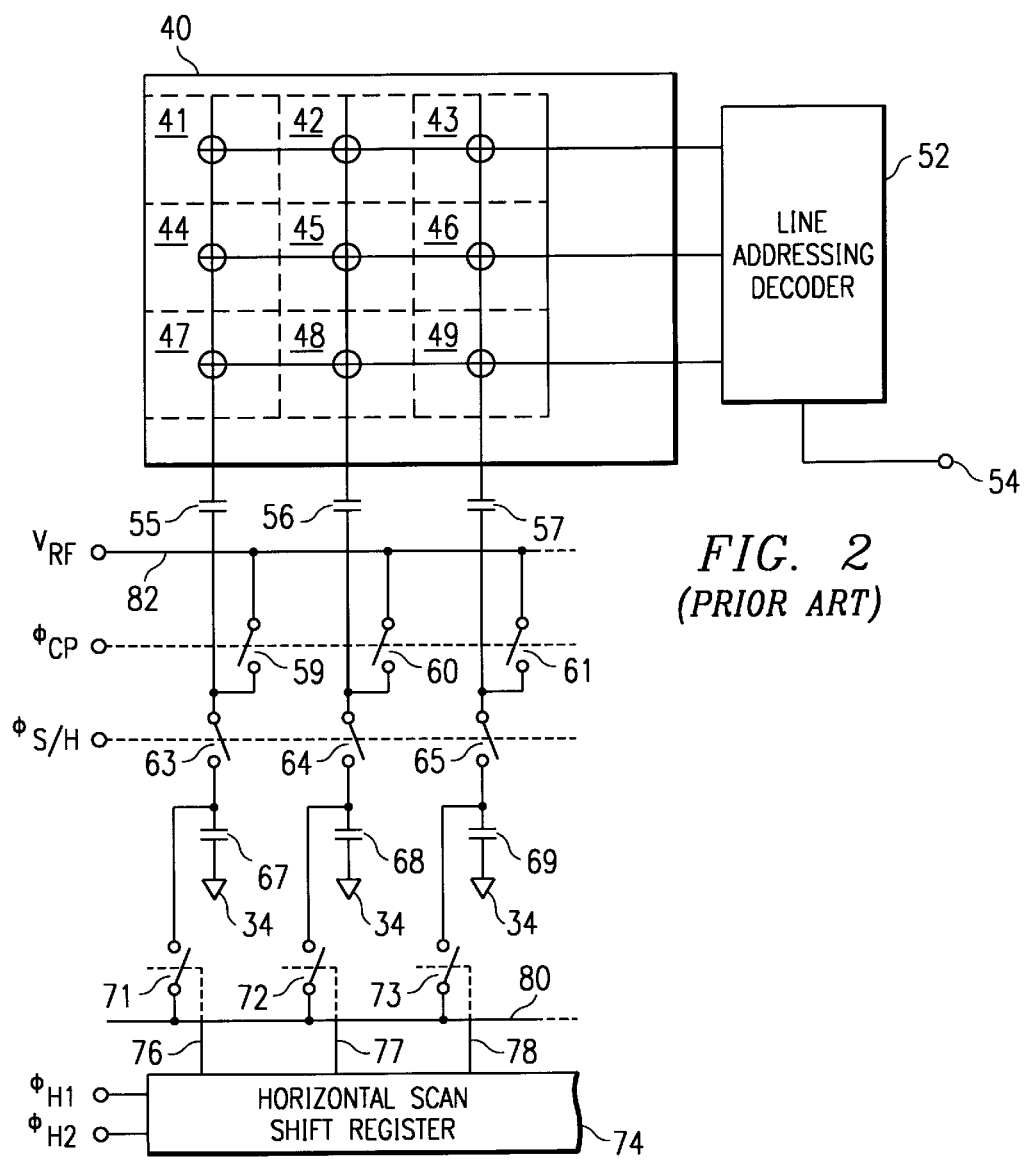
FIG. 2 is a circuit diagram of a portion of a prior art image sensing array showing three columns and three rows of the device image sensing area.

A typical prior art active pixel sensor with associated output circuitry is shown in FIG. 1, The device of FIG. 1 includes active pixel sensor transistor 20, photocharge storage well 22, capacitor 24, current source 26, switches 28 and 30, holding capacitor 32, drain voltage $V_{dd}$, line address signal $\phi_{PG}$, reference voltage $V_{RF}$, switch control signal $\phi_{S/H}$, switch control signal $\phi_{CP}$, and common node 34. FIG. 2 is a circuit diagram of a portion of a prior art image sensing array showing three columns and three rows of the device image sensing area. The circuit of FIG. 2 uses the prior art circuit of FIG. 1. The device of FIG. 2 includes photosite array 40, photosites 41–49, line addressing decoder 52, line address input node 54, coupling capacitors 55–57, switches 59–61, switch control signal $\phi_{CP}$, switches 63–65, switch control signal $\phi_{S/H}$, holding capacitors 67–69, scan switches 71–73, horizontal scan shift register 74, shift register control signals $\phi_{H1}$ and $\phi_{H2}$, shift register switch control lines 76–78, sense line 80 (more than one sense line can be used), reference voltage line 82, reference voltage $V_{RF}$, common node 34. Holding capacitors 67–69 form a bank of storage capacitors which store the data from one horizontal line in the photosite array 40.

The circuit of FIGS. 1 and 2 is efficient in removing the pixel fixed pattern noise by clamping and sampling operations. Referring to FIG. 1, the clamping and sampling operations begin by turning on switches 28 and 30 when the photosite 20 is ready to be read out. This charges capacitor 24 to reference voltage $V_{RF}$. After both switches 28 and 30 are turned off, the photosite 20 is reset by either pulsing $\phi_{PG}$ or by a separate photocell reset means. The switch 30 is closed again for a short time. This process generates a signal stored on holding capacitor 32 which is proportional to the difference of the photosite voltage with the image signal and without the image signal. The photosite threshold variations are removed since this sensing process measures only a difference.

A problem is created when the bank of capacitors 67–69, shown in FIG. 2, is scanned by the individual switches 71–73. The switches 71–73 cannot be made identical. Each switch 71–73 transfers a different amount of switching charge on the sense line 80 in addition to the signal. This switching feedthrough is the same for each horizontal line of video. Because all the photosites in a particular vertical line are read out through the same switch, the switching feedthrough appears as a vertical-fixed-pattern-noise (VFPN).

The preferred embodiment scanning circuit shown in FIG. 3 solves the VFPN problem described above. The circuit of FIG. 3 includes holding capacitors 67–69, switches 71–73, horizontal scan shift register 74, shift register control signals $\phi_{H1}$ and $\phi_{H2}$, And gates 90–92 (logic gates), switch control lines 76–78, strobe signal $\phi_{ST}$, sense line 80, amplifier 94, capacitor 96, amplifier reset switch 98, amplifier reset signal $\phi_{RSA}$, amplifier reference voltage $V_{RFA}$, output voltage $V_{OUT}$, and common node 34. The circuit of FIG. 3 shows a portion of the circuit of FIG. 2 with the addition of And gates 90–92. For the preferred embodiment, any type of active pixel sensor such as a bulk charge modulated device can be used.

Referring to FIG. 3, And gates 90–91 have been added to the scan switch control lines 76–78, which come directly from the horizontal scanning register 74 in the prior art device shown in FIG. 2. The And gates 90–91 allow an additional strobe signal $\phi_{ST}$ to be used during readout.

FIG. 4 is a timing diagram showing shift register output $\phi_{SR}$ for And gate 90, $\phi_{ST}$, $\phi_{RSA}$, and $V_{OUT}$. The shift register 74 is advanced by a one pixel shift and then a first strobe pulse 100 is applied. This connects selected capacitor 67, to the sense line 80 and transfers the stored charge to the amplifier input 95. Signal level 102 appears at the output of amplifier 94 which corresponds to the stored charge on capacitor 67 plus the feedthrough charge from switch 71. Then the amplifier 94 is reset by a pulse 104 from signal $\phi_{RSA}$. Then a second strobe pulse 106 is applied. This time only the scanning switch feedthrough is transferred on sense line 80 because capacitor 67 was discharged when the signal was read before. The output $V_{OUT}$ of the amplifier 94 then corresponds to only the feed through charge 108, as shown in FIG. 4.

The preferred embodiment double pixel readout concept provides both image signal plus feedthrough information and feedthrough only information for each pixel. The feedthrough information is easy to subtract from the previous pulse by a clamping and sampling operation such as performed by the circuit of FIG. 5.

The clamping and sampling circuit of FIG. 5 includes amplifier 94, capacitor 96, amplifier reset switch 98, amplifier reset signal $\phi_{RSA}$, amplifier reference voltage $V_{RFA}$, capacitor 120, switch 122, switch control signal $\phi_{CPO}$, switch 124, switch control signal $\phi_{SHO}$, capacitor 126, buffer 128, output $V_{OUT2}$, and common node 34. FIG. 6 is a timing diagram for the circuit of FIG. 5. FIG. 6 includes output voltage $V_{OUT}$ (described in FIG. 4), switch control signal $\phi_{CPO}$, and switch control signal $\phi_{SHO}$. By pulsing $\phi_{CPO}$ and $\phi_{SHO}$ as shown in FIG. 6, the output $V_{OUT2}$ will be the difference between signal level 132 and signal level 134 of $V_{OUT}$. Other subtraction schemes such as sampling and subtraction by a differential amplifier or delay line can also be used.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A device for sensing light comprising:

an active pixel sensor;

a holding capacitor for storing a pixel signal from the active pixel sensor;

a scanning switch coupled between the holding capacitor and a sense line;

a switch control line for turning the switch on and off;

a logic gate having a horizontal scan shift register input and a strobe input, the switch control line is an output of the logic gate.

2. The device of claim 1 wherein the logic gate is an And gate.

3. The device of claim 1 further comprising:

a coupling capacitor coupled between the holding capacitor and the active pixel sensor;

a first switch for connecting the coupling capacitor to the holding capacitor; and a second switch for connecting a reference voltage node to the coupling capacitor.

4. The device of claim 1 further comprising:

an amplifier having an input coupled to the sense line; and a subtraction circuit coupled to an output of the amplifier.

5. The device of claim 4 wherein the subtraction circuit is a clamping and sampling circuit.

6. A method for sensing light comprising:

converting a light signal to an image pixel signal;

storing the image pixel signal on a holding capacitor;

reading out the image pixel signal from the holding capacitor through a switch;

reading out a noise signal from the switch after the holding capacitor has been discharged; and subtracting the noise signal from the image pixel signal.

* * * * *